Figure 1:
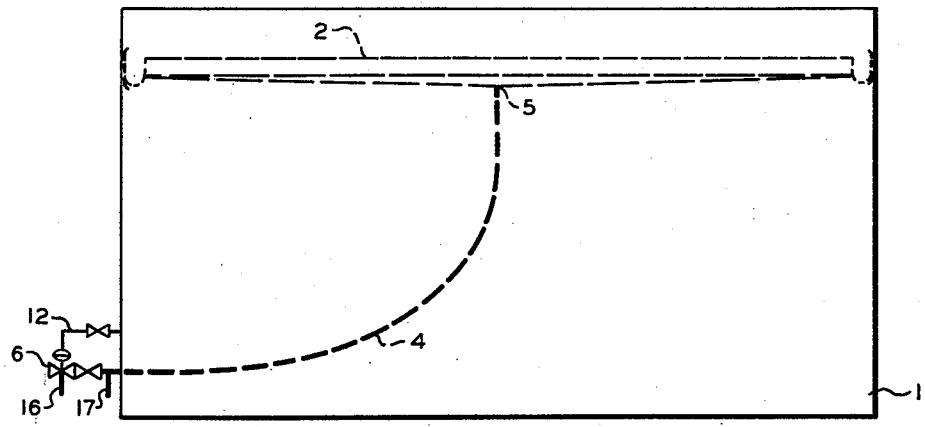

Jan. 22, 1963  G. P. JENNINGS  3,074,587
AUTOMATIC DRAIN FOR A FLOATING ROOF TANK
Filed April 2, 1959

INVENTOR.
G.P. JENNINGS
BY Hudson & Young
ATTORNEYS

United States Patent Office 3,074,587
Patented Jan. 22, 1963

3,074,587
AUTOMATIC DRAIN FOR A FLOATING
ROOF TANK
Gerald P. Jennings, Bartlesville, Okla., assignor to Phillips
Petroleum Company, a corporation of Delaware
Filed Apr. 2, 1959, Ser. No. 803,730
18 Claims. (Cl. 220—26)

This invention relates to an automatic drain for a floating roof tank. In one of its aspects, the invention relates to an automatic drain for a floating roof tank having a hose connecting a low point of the roof with a valve to the exterior of the tank at a point near the bottom and below the level of the roof, said valve being provided with a weep hole to permit the draining of liquid in the hose from the hose while the valve is in a closed position. In another of its aspects, the invention relates to such a drain as described in which the valve is not able to prevent full flow in closed position so that some leakage can occur even if it is not provided with a weep hole. In a further aspect of the invention, it relates to a combination of a drain hose for a floating roof and a valve, the valve being balanced sufficiently that the difference in densities between stored products and liquid in the drain hose will cause the valve to open and to keep draining the hose whenever the hydraulic pressure created by the level of liquid in the hose exceeds the hydraulic pressure created by the liquid level in the tank. In a still further aspect of the invention, it relates to the use of a double-seated diaphragm valve as said valve in said combination with said hose. In a further aspect still, the invention relates to the provision of a weep hole in the drain hose or its connection to the valve, regardless of the construction of the valve so that liquid can weep from the hose. In a still further aspect, the invention relates to a combination as here described wherein means are provided to collect and to retain leaked product which has been drained from said hose. In a still further aspect of the invention, it relates to a method of automatically draining water, such as rain water, from the top of a floating roof, as in a product storage tank, from which the water is ordinarily drained employing a flexible hose connection, the method comprising passing the water in the hose to a valve, maintaining said valve in normally closed position, providing slow leakage from said valve, and arranging the valve so that it will open only responsive to the pressure of the static head of water in said hose whenever said head reaches a predetermined level.

The use of rubber hose connections to connect a low point in a floating roof, as in a tank, with a valve to the outside of the tank to drain rain water from the floating roof has become quite a problem in recent years. Users of hose connections encounter said problem as the hose ages. Thus, as the hose becomes older, leaks develop and one does not really know whether the drain valve at the end of the hose should be left open at all times so that, when it rains the rain water will be drained, or closed at all times, in which event it is necessary to open the valve every time it rains to draw the water off from the floating roof. Regardless of which operation is adopted, that is, keeping the valve open at all times and running the risk of loss of product in the event of hose failure or keeping the valve closed at all times but having to open it periodically whenever there has been a rainfall, there is a problem.

I have now conceived of a combination valve and hose system for floating roofs, as used in floating roof-type tanks, in which the valve can be maintained in closed position at all times when there is insufficent water in the drain hose to require immediate draining of the same, the valve in the combination being so constructed and arranged in the combination that it will open whenever water in the hose exceeds a level whereby its static pressure is greater than the static pressure of liquid in the tank.

Figure 2:
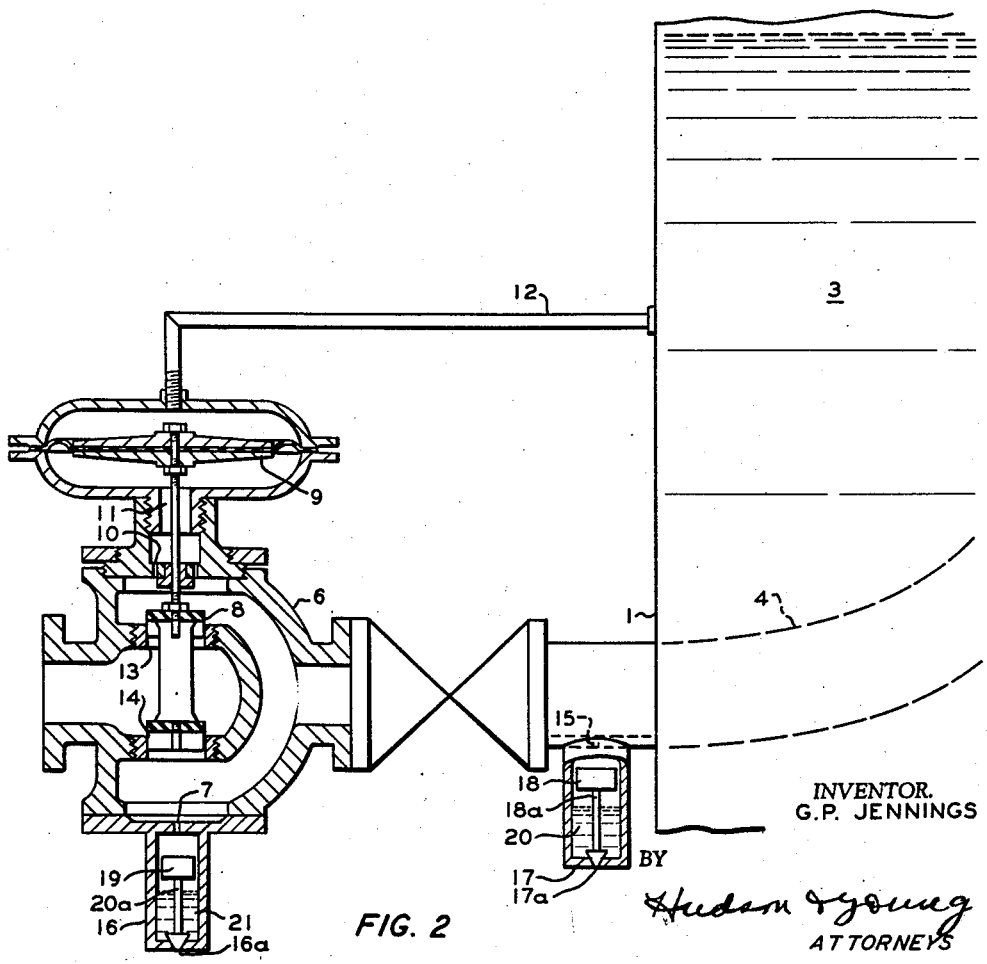

FIGURE 1 is a schematic showing of a floating roof tank equipped with a hose and valve combination of the invention. FIGURE 2 shows, in more detail, a specific embodiment of the invention in which a double-seated diaphragm-type valve is used.

It is an object of this invention to provide an automatic drain for a floating roof tank. It is a further object of this invention to provide a drain for floating roofs of such a character that the drain valve associated with the drain hose of such a roof can be kept closed at all times when it is not raining, yet it will open automatically when there is water to be drained from said roof. A further object of the invention is to provide a hose and valve combination for a floating roof which permits visual observation of the product which may be leaking through a faulty hose connecting a low point of the floating roof with said valve. It is a further obect of the invention to provide for visual observation of product leaking into such a hose, regardless of the type of construction of valve employed.

It is a further object of the invention to provide for visual evidence of leaked product which has leaked through a ruptured hose even when said product is volatile, such as gasoline, and the observer is not able to make his observation within the time it would take for leaked product to normally evaporate. A further object of the invention is to provide a method for draining water from on top of a floating roof, as in a floating roof product storage tank. A further object still is to provide for a system wherein the drain ordinarily provided at the end of a drain hose is maintained normally in closed position and opens responsive to the need to drain water which otherwise will accumulate on said roof.

Other aspects, objects, and the several advantages of the invention are apparent from a study of this disclosure, the drawings, and the appended claims.

According to the present invention, there is provided a method of removing water from on top of a floating roof, as in a floating roof storage tank containing a stored liquid product, such as gasoline, which comprises providing a hose connecting a low point of said roof and a valve connecting with the exterior of said tank at a low point of said tank and arranging said valve to be responsive only to the pressure of the static head of water which can collect in said hose to be opened thereby whenever the water in said hose reaches a proportional level relative to the stored product level in said tank. In the specific embodiment described herein, the method is accomplished employing a double-seated diaphragm valve to the diaphragm of which, as later described, is led the pressure of the static head of water in the hose on that side of the diaphragm which will cause the valve to open and to which is led on the other side thereof the static head of pressure of the stored product in the tank.

Also, according to the invention, the valve which is employed is arranged to leak slowly at all times either through the valve seating means and/or by means of a weep hole. Further, in one embodiment of the invention, a portion of the hose or a pipe connection which protrudes from the tank, to which the hose is attached, can be provided with a weep hole either as the sole weep hole or additional to the weep hole in the valve itself.

Further, as an important feature of the invention, steps are taken to provide a collecting zone below a weep hole to collect leakage of product from the tank. The liquid level in these zones is controlled so that water therein is kept at or somewhat below a predetermined level.

Also, according to the invention, there is provided an apparatus comprising, in combination, in a storage tank, a floating roof, a hose connecting a low point of said roof and a low point outside said tank, a normally closed valve attached to said hose, and means cooperating with said valve responsive to the static head in said hose to open said valve whenever the static head in said hose reaches a proportional level relative to the stored product level in said tank.

Also, according to the invention, there are provided features, singly and in combination, such as means to permit slow leakage through said normally closed valve and/or to collect leakage of product, as further set forth and described below.

Referring now to the figures to the drawings, 1 is a tank having a floating roof 2. This tank is substantially filled with hydrocarbon product, in this instance gasoline 3. Hose 4 connects the lowest point 5 of roof 2 with double-ported valve 6. In this embodiment, valve 6 will allow water or any other liquid in hose 4 to leak or weep out through weep hole 7. The design and proportions of the valve are such that, should hose 4 be substantially filled with gasoline, the valve member 8 will not leave its closed position. However, when the hose is sufficiently filled with water, which as is known is heavier than gasoline, the valve member 8 will be raised due to the pressure of the water which is transmitted to diaphragm 9 by way of orifices 10 and 11. The upper side of diaphragm 9 is connected by way of pipe 12 to tank 1. In this embodiment, valve element 8 at its two largest diameters is somewhat smaller than the stationary seat or sealing portions of ports 13 and 14 of the valve body. Thus, when there is a rupture in the hose and there is no water in it, the hydrostatic head of gasoline which fills the hose will be insufficient to open the valve, yet the leakage through the valve and at the weep hole will give a warning. Yet, when it rains and the hose is in good condition, the hydrostatic head of water will drain the roof because this last head is sufficient to open the valve. Some water will remain in the hose when the roof has been drained. This remaining water will leak out the valve and the weep hole.

One skilled in the art in possession of this disclosure can readily calculate the size diaphragm required for any specific choice of valve. The illustrated valve, it will be observed, is substantially perfectly balanced, the total upward thrust being substantially equal to the total downward thrust when the tank contains gasoline and the level of water in the hose is about ¾ that of the gasoline in the tank. This assumes a density of the gasoline in the tank equal to 0.75 that of water. Also, said skilled person will understand that the valve is selected for the specific duty it is to perform. Generally assuming a balanced valve, the height of the water in the hose sufficient to open the valve will be a function of the relative density of the product stored in the tank.

The valve will close before all water is drained from the hose. However, the remaining water will drain, as earlier described, through the valve and the weep hole.

It is within the scope of the invention to replace the pipe 12 with a spring acting on the top of diaphragm 9 to provide a downward thrust on the diaphragm approximately equal to that of the static head of gasoline, the pressure of which in the described embodiment acts through pipe 12 on diaphragm 9.

It is also within the scope of the invention to provide another weep hole 15 additional to hole 7 as a sole hole.

Furthermore, as a feature of the invention, a vessel 16 and/or a vessel 17, provided with float and needle valve controlled weep holes 16A and 17A are provided to capture any gasoline which is leaked into and from the hose to provide for visual observation of leaks in the hose which may be so slow that evaporation keeps ahead of the leaks so that no gasoline shows below the weep hole. Or it can happen that the leak in the hose is operative in a certain position of the hose corresponding to a certain position of the roof in the tank and that the leaked product will have evaporated or have been washed away. Floats 18 and 19 prevent rapid evaporation of the leaked gasoline in vessels 16 and 17. Accumulated gasoline, the evaporation surface of which has been reduced by the floats, is shown at 20 and 21. Floats 18 and 19 open their respective needle valves 18A and 20A to cause leakage of any water from vessels 16 and 17 thus to provide at all times space to accommodate and to accumulate leaking gasoline.

As shown, the vessels 16 and 17 are placed tightly up to the surfaces surrounding holes 7 and 15 to prevent air currents from blowing away any slowly leading or periodically leaking gasoline. The features here described lead to early discovery of leaks in hoses and to additional economy and can avoid having to pump out a tank just to change or to repair a hose, since leaks are early discovered and arrangements can be made to make the repairs at a time when the tank is substantially pumped out anyway.

Reasonable variation and modification are possible within the scope of the foregoing disclosure, drawing and the appended claims to the invention, the essence of which is that there have been provided a method for removing water from on top of a floating roof, as in a floating roof storage tank, which comprises passing said water through a hose into a valve, the valve being responsive to the pressure of the static head of water in said hose to open when the head of water in said hose reaches a predetermined value, substantially as decribed, and that apparatus comprising a floating roof storage tank having a drain hose attached to a low point thereof and to a valve which opens responsive to static head of water in the drain hose and which is designed to provide a slow leak, substantially as described, have been provided.

I claim:

1. In combination with a storage tank having a floating roof and means to drain water tending to collect on said roof, conduit means in open communication with said roof and ending at a low point outside said tank and normally closed means, opening responsive to a predetermined static head in said conduit, closing the low point end of said conduit.

2. An apparatus according to claim 1 wherein said means closing the low point end of said conduit is provided with a slow leak zone to permit only slow leakage of stored product in the event of failure of said hose.

3. An apparatus according to claim 1 wherein the means closing the low point end of said conduit is balanced against the pressure therein so that the difference in densities of the water and product and their respective levels will cause said means closing the low point end of said conduit to open only responsive to a predetermined level of water in said hose.

4. An apparatus according to claim 3 wherein at least one of the means closing the low point end of said conduit and hose is provided with a weep outlet to cause liquid in the hose to leak therefrom to permit visual observation of liquid passing into the hose from the tank at least whenever water is not being drained from said hose through said weep hole.

5. An apparatus according to claim 4 wherein there is provided a collecting means to collect the liquid from said weep outlet whenever it emerges therefrom so that it can be later observed.

6. An apparatus according to claim 5 wherein draining means are provided to drain water from the liquid collected in the collecting means down to a predetermined level and in which collecting means there is provided above the normal water level a space for collecting any leaked product.

7. An apparatus according to claim 6 wherein means are provided to drain water from said collecting means automatically responsive to the level of water in said collecting means.

8. In combination with a storage tank, a floating roof, a hose connecting a low point of said roof and a low point outside said tank, a normally closed valve attached to the lower end of said hose at said low point outside said tank, and means cooperating with said valve responsive to static head in said hose to open said valve whenever the static head in said hose above said valve reaches a predetermined value.

9. An apparatus according to claim 8 wherein the valve is a double-seated diaphragm valve responsive to the static heads in said hose and said tank.

10. An apparatus according to claim 9 wherein said valve does not completely seal when it is in closed position.

11. An apparatus according to claim 8 wherein said hose at a point outside the tank is provided with a weep hole.

12. An apparatus according to claim 11 wherein a collecting vessel is positioned below said weep hole.

13. An apparatus according to claim 12 wherein the collecting vessel is provided with a drain outlet, a float and a valve connected to said float and said outlet in a manner to open and close said outlet responsive to level of water in said vessel.

14. An apparatus according to claim 8 wherein said valve is a diaphragm actuated valve, there is a fluid pressure connection between said hose and that side of the diaphragm, pressure on which opens the valve, and there is a fluid pressure connection between the other side of the diaphragm and a point in said tank above said diaphragm.

15. In combination with a storage tank having a floating roof and means to drain water tending to collect on said roof, conduit means in open communication with said roof and ending at a low point outside said tank and normally closed means, opening responsive to a predetermined static head in said conduit and to the static head of product at a predetermined level in said tank, closing the low point end of said conduit.

16. In combination with a storage tank, a floating roof, a hose connecting a low point of said roof and a low point outside said tank, a normally closed valve attached to the lower end of said hose at said low point outside said tank, and means cooperating with said valve responsive to static head in said hose to open said valve whenever the static head in said hose above said valve reaches a predetermined value, said valve being a double-seated diaphragm valve and said valve being provided on the upstream side thereof with a weep hole.

17. An apparatus according to claim 16 wherein a collecting vessel is positioned below said weep hole.

18. An apparatus according to claim 17 wherein the collecting vessel is provided with a drain outlet, a float and a valve connected to said float and said outlet in a manner to open and close said outlet responsive to level of water in said vessel.

References Cited in the file of this patent
UNITED STATES PATENTS

| | | |
|---|---|---|
| 1,801,172 | Patterson | Apr. 14, 1931 |
| 2,497,645 | Wiggins | Feb. 14, 1950 |
| 2,643,023 | Moyer | June 23, 1953 |
| 2,737,979 | Parker | Mar. 13, 1956 |
| 2,789,722 | Oberst | Apr. 23, 1957 |
| 2,791,238 | Bryant | May 7, 1957 |